Patented Sept. 27, 1949

2,483,248

UNITED STATES PATENT OFFICE 2,483,248

PROCESS FOR PREPARING COMPOUNDS HAVING FOLIC ACID ACTIVITY

Jacob L. Stokes, Scotch Plains, N. J., assignor to Merck & Co., Inc., Rahway, N. J., a corporation of New Jersey No Drawing. Application October 14, 1944, Serial No. 558,748

3 Claims. (Cl. 195—96)

This invention relates to improvements in the preparation of physiologically active chemical compounds by fermentation processes. In a more particular sense, it is concerned with a process for preparing a substance exhibiting the physiological activity of folic acid.

By the term "folic acid" as herein used is meant a factor derived from spinach or liver which is capable of promoting, in substantially equal degree, the growth of the organisms L. casei and S. lactis R. It is known that folic acid as thus defined is useful in correcting dietary deficiencies in poultry, particularly chick anemia. By practice of the present invention a product is obtained which, upon the basis of biological assay and in terms of physiological activity, is substantially identical with folic acid.

In accordance with one aspect of the present invention this new substance having the physiological activity of folic acid as above defined is obtained by propagating an organism selected from the class consisting of S. lactic R, S. fecalis and S. zymogenes in a nutrient medium free of folic acid but containing assimilable sources of carbon, nitrogen, minerals and vitamins and containing rhizopterin. Rhizopterin is a pterin-like acidic compound having a molecular weight of the order of 350, and approximate carbon, hydrogen, nitrogen content of 53% carbon, 4.0% hydrogen and 25% nitrogen, the remainder being oxygen, which is obtained by processing a fumaric acid fermentation liquor adsorbate as described in co-pending application by Keresztesy et al., Serial No. 536,434, filed May 19, 1944, now Patent No. 2,478,404. Aside from absence of folic acid from the synthetic nutrient medium, the medium is otherwise typical. Among suitable assimilable sources of carbon are sugars such as glucose, levulose, d-ribose, sucrose, xylose, galactose, lactose, maltose and salicin. The essential amino acids are suitable sources of nitrogen and the usual trace minerals must be present in the medium together with members of the B group of water-soluble vitamins. The preferable concentration of rhizopterin in the medium is found to be within the range of about 0.005 to 0.05 microgram per 100 cc. of medium.

For optimum yield of the desired product the operations are conducted at a temperature within the range of 30–40° C. and preferably at about 37° C. When practicing the process according to this invention the product obtained is readily destroyed by oxidation, accordingly the operations are conducted under anaerobic conditions for example, using an atmosphere of nitrogen or other inert gas.

In general the yield of the desired product is proportional to the rhizopterin present in the medium and to the quantity of cells present. For example adopting a specified concentration of cells as a unit standard it is found that 4.7 micrograms of folic acid are obtained; upon doubling the concentration of the cells in the medium a yield of 7.6 micrograms is obtained; when the unit amount is present in four times the standard about 12.8 micrograms of folic acid are obtained.

Of the three organisms above mentioned as suitable for use in practice of the process according to this invention the organisms S. lactis R and S. fecalis, particularly the strain S. fecalis F24 are preferred. The strain S. zymogenes 5Cl is found satisfactory for use in the presently invented process.

Folic acid when obtained according to the process of the present invention is a metabolite of the organisms utilized and accordingly the organisms can be utilized while still growing, in which instance the process is conducted using a nutrient medium, or alternatively the organisms can be utilized in fully grown condition in which instance it is merely necessary to supply rhizopterin to the organism for production of folic acid.

The following examples illustrate methods of carrying out the present invention, but it is to be understood that these examples are given by way of illustration and not of limitation.

Example 1

A medium is prepared having the following composition:

| | | |
|---|---|---|
| Glucose | do | 1.0 |
| Hydrolyzed casein (vitamin free) | do | 0.5 |
| l-cystine | do | 0.01 |
| l-tryptophane | do | 0.01 |
| Sodium acetate (anhydrous) | do | 0.6 |
| Adenine | do | 0.0005 |
| Guanine | do | 0.0005 |
| Uracil | do | 0.0005 |
| Potassium phosphate, monobasic | do | .05 |
| Potassium phosphate, dibasic | do | .05 |
| Magnesium sulfate, 7H$_2$O | do | .02 |
| Sodium chloride | do | .001 |
| Ferrous sulfate, 7H$_2$O | do | .001 |
| Manganese sulfate 4H$_2$O | do | .001 |
| Riboflavin | micrograms | 10.0 |
| Pantothenic acid | do | 10.0 |
| Pyridoxine | do | 10.0 |
| Thiamin | do | 10.0 |
| Nicotinic acid | do | 10.0 |
| Biotin | do | 0.01 |
| ϵ-Aminobenzoic acid | do | 2.0 |
| Rhizopterin | do | .06 |
| Distilled water to 100 cc. | | |

The medium is inoculated with a culture of the organism S. lactis R and the cells are permitted to grow overnight (16–18 hours), while maintaining the temperature within the range 30–40° C. and preferably 37° C. The culture is then centrifuged and the supernatant liquor is found to contain folic acid in the amount of approximately 0.003 microgram per cc. as determined by biological assay using organism L. casei.

*Example 2*

The organism S. lactis R is grown upon a medium as described in Example 1 and after centrifuging, the cells are collected and suspended in aqueous solution of alkali metal mono- or di-hydrogen phosphate (about 7.5 molar), buffer at pH 8. About 40 microbrams of rhizopterin and about 128 mgm. of glucose are added to about 36 cc. of this cell suspension together with water to a total volume of 40 cc. and the mixture is agitated using a stream of inert gas, preferably nitrogen, for about 3 hou s at 37° C. The mixture is then centrifuged and the cells are removed and assayed. It is found that the cells upon biological assay exhibit folic acid activity to a greater degree per unit weight than the product obtained as described in Example 1.

*Example 3*

The operations described in Example 1 are repeated except that the organism S. lactis R is replaced with the organism S. fecalis F24 and the product obtained is found to exhibit folic acid activity as determined by biological assay.

*Example 4*

The operations described in Example 2 are repeated except that the organism S. lactis R is replaced with the organism S. Fecalis F24 and the product obtained is found to exhibit folic acid activity as determined by biological assay.

*Example 5*

The operations described in Example 1 are repeated except that organism S. Zymogenes 5Cl is used instead of S. lactis R and the product obtained is found to possess the physiological activity of folic acid.

*Example 6*

The operations described in Example 2 are repeated except that organism S. Zymogenes 5Cl is used instead of S. lactis R and the product obtained is found to possess the physiological activity of folic acid.

In Examples 2, 4 and 6 wherein resting cells of the organism are utilized in producing folic acid, the product obtained can be utilized directly for enriching poultry feed or it can be autolyzed or digested with a diastatic enzyme and purified. A preferred method for obtaining folic acid from the cells constituting the products described in Examples 2, 4 and 6 above, is to mix the cells with water and heat the mixture in an autoclave at a pressure of about 15 lbs. per square inch for approximately 30 minutes in the presence of a reducing agent for example ascorbic acid or an alkali metal thioglycoll.e.

Modifications may be made in carrying out the present invention without departing from the spirit and scope thereof and the invention is to be limited only by the appended claims.

What is claimed is:

1. The process which comprises subjecting rhizopterin to the action of an organism selected from the group consisting of S. lactis R, S. fecalis and S. zymogenes in a synthetic aqueous medium and under anaerobic conditions, and recovering a compound having folic acid activity.

2. The process which comprises subjecting rhizopterin to the action of an aqueous suspension of resting cells of an organism selected from the group consisting of S. lactis R, S. fecalis, and S. zymogenes under anaerobic conditions and recovering a compound having folic acid activity.

3. The process which comprises subjecting rhizopterin to the action of an organism selected from the group consisting of S. lactis R, S. fecalis, and S. zymogenes in a synthetic nutrient medium and under anaerobic conditions, and recovering a compound having folic acid activity.

JACOB L. STOKES.

REFERENCES CITED

The following references are of record in the file of this patent:

UNITED STATES PATENTS

| Number | Name | Date |
|---|---|---|
| 2,391,850 | Welch | Dec. 25, 1945 |
| 2,407,096 | Pfiffner | Sept. 3, 1946 |

OTHER REFERENCES

Totter et al. Jr. Biol. Chem., 147 (1943), pages 257, 258.

Elvijhelm et al. Jr. Biol. Chem., 145 (1942), pages 713, 14.

Chem. Abst: 37:1476, Intestinal bacterial synthesis as a source of B vitamin for the rat, Herschel K. Mitchell and Edith R. Isbell, University of Texas pub. No. 4237, 125–34 (1942).

Chem. Abst: 35:6608, Concentration of folic acid, Herschel K. Mitchell, Esmond E. Snell, & Rober J. Williams, J. A. C. S. 63, 2284 (1941).

Certificate of Correction

Patent No. 2,483,248 — September 27, 1949

JACOB L. STOKES

It is hereby certified that errors appear in the printed specification of the above numbered patent requiring correction as follows:

Column 2, line 32, for the word "do" read *grams*; line 56, for "ϵ-Aminobenzoic acid" read *p-Aminobenzoic acid*;

and that the said Letters Patent should be read with these corrections therein that the same may conform to the record of the case in the Patent Office.

Signed and sealed this 18th day of April, A. D. 1950.

[SEAL]

THOMAS F. MURPHY,
*Assistant Commissioner of Patents.*